United States Patent
Ikebukuro et al.

(10) Patent No.: US 9,702,463 B2
(45) Date of Patent: Jul. 11, 2017

(54) SEAL DEVICE (71) Applicants: Koyo Sealing Techno Co., Ltd., Tokushima (JP); Nabtesco Corporation, Tokyo (JP)

(72) Inventors: Kazuha Ikebukuro, Tokushima (JP); Koji Kubota, Mie (JP); Shuji Kurita, Mie (JP)

(73) Assignees: Koyo Sealing Techno Co., Ltd., Tokushima (JP); Nabtesco Corporation, Tokyo (JP)

( * ) Notice: Subject to any disclaimer, the term of this patent is extended or adjusted under 35 U.S.C. 154(b) by 4 days.

(21) Appl. No.: 15/117,295

(22) PCT Filed: Feb. 16, 2015

(86) PCT No.: PCT/JP2015/054158
§ 371 (c)(1),
(2) Date: Aug. 8, 2016

(87) PCT Pub. No.: WO2015/133255
PCT Pub. Date: Sep. 11, 2015

(65) Prior Publication Data
US 2016/0348789 A1    Dec. 1, 2016

(30) Foreign Application Priority Data
Mar. 7, 2014  (JP) ................. 2014-044955

(51) Int. Cl.
*F16J 15/32* (2016.01)
*F16J 15/00* (2006.01)
*F16J 15/3232* (2016.01)

(52) U.S. Cl.
CPC ......... *F16J 15/008* (2013.01); *F16J 15/3232* (2013.01)

(58) Field of Classification Search
CPC ....... F16J 15/32; F16J 15/2304; F16J 15/3244
See application file for complete search history.

(56) References Cited

U.S. PATENT DOCUMENTS 4,084,826 A * 4/1978 Vossieck .............. F16J 15/3244
                                                         277/559
4,183,543 A * 1/1980 Antonini .............. F16J 15/3244
                                                         277/559

(Continued)

FOREIGN PATENT DOCUMENTS

JP    2000-329237 A    11/2000
JP    2001-099328 A     4/2001

(Continued)

OTHER PUBLICATIONS

International Search Report issued in corresponding application No. PCT/JP2015/054158 mailed May 19, 2015 (4 pages).

(Continued)

*Primary Examiner* — Gilbert Lee
(74) *Attorney, Agent, or Firm* — Osha Liang LLP (57) ABSTRACT

A sealing device includes an elastic annular seal portion. On an inner peripheral surface of the seal portion, a main lip is in slidable contact with an outer peripheral surface of a rotary shaft, and a vacuum space side inclined surface gradually enlarges in diameter from the main lip toward a vacuum space side. On the vacuum space side inclined surface, a first annular projection is in slidable contact with the outer peripheral surface of the rotary shaft, and a second annular projection that projects toward a radially inward side is disposed between the main lip and the first annular projection. In an initial use state of the sealing device, the second annular projection is not in slidable contact with the rotary shaft; when the main lip wears to a degree that required sealing performance cannot be maintained, the (Continued)

second annular projection starts slidable contact with the rotary shaft.

6 Claims, 5 Drawing Sheets

(56) References Cited

U.S. PATENT DOCUMENTS

| | | | | |
|---|---|---|---|---|
| 4,399,998 | A | * | 8/1983 | Otto .................... F16C 33/7823 277/552 |
| 4,815,749 | A | * | 3/1989 | Johnston .............. F16J 15/3244 277/559 |
| 2008/0199113 | A1 | | 8/2008 | Peschke et al. |
| 2016/0153564 | A1 | | 6/2016 | Ikebukuro et al. |

FOREIGN PATENT DOCUMENTS

| | | | |
|---|---|---|---|
| JP | 2003307224 | A | 10/2003 |
| JP | 2008546970 | A | 12/2008 |
| JP | 2009180252 | A | 8/2009 |
| JP | 2015048855 | A | 3/2015 |
| WO | 2014203609 | A1 | 12/2014 |

OTHER PUBLICATIONS

Written Opinion of the International Searching Authority issued in corresponding application No. PCT/JP2015/054158 mailed May 19, 2015 (3 pages).

* cited by examiner

SEAL DEVICE

TECHNICAL FIELD

The present invention relates to a sealing device for, for example, partitioning an annular space between a rotary shaft and a housing surrounding the rotary shaft, into an atmospheric pressure space and a vacuum space.

BACKGROUND ART

Hitherto, in order to provide a rotational force to a device within a vacuum container whose inner space is made a vacuum, a rotary shaft for rotational force transmission may be provided so as to project from the inside of the vacuum container to the outside thereof.

In this case, in order to maintain a vacuum state by preventing atmospheric air from leaking from an annular space between the rotary shaft and a through hole, which is provided in the vacuum container for inserting the rotary shaft therethrough, into the vacuum container, a sealing device is mounted in the annular space (see e.g., PATENT LITERATURE 1).

CITATION LIST

Patent Literature

PATENT LITERATURE 1: Japanese Laid-Open Patent Publication No. 2001-99328

SUMMARY OF INVENTION

In the above sealing device, a seal lip of the sealing device which is in slidable contact with the rotary shaft to seal between the inside and the outside of the vacuum container may be pressed excessively against the rotary shaft by the difference in pressure between the inside and the outside of the vacuum container in addition to an interference that is provided beforehand. If the seal lip is pressed excessively against the rotary shaft as described above, wear of the seal lip is accelerated, so that there is a possibility that the sealing performance of the sealing device deteriorates early and the service life of the sealing device is significantly reduced.

One or more embodiments of the present invention provide a sealing device that is able to maintain sealing performance over a long period of time.

In one or more embodiments, a sealing device partitions an annular space that is formed between a rotary shaft and a housing surrounding the rotary shaft in an axial direction into a low-pressure space and a high-pressure space whose pressure is higher than that of the low-pressure space. The sealing device includes an annular seal portion formed of an elastic material and is in slidable contact with an outer peripheral surface of the rotary shaft. On an inner peripheral surface of the seal portion, a main lip is formed so as to be in slidable contact with the outer peripheral surface of the rotary shaft, and an inclined surface is formed so as to extend from the main lip toward the low-pressure space side and gradually enlarge in diameter toward the low-pressure space side; on the inclined surface, a first annular projection is formed so as to be in slidable contact with the outer peripheral surface of the rotary shaft in a state where the main lip is in slidable contact with the outer peripheral surface of the rotary shaft, and a second annular projection is formed so as to be disposed between the main lip and the first annular projection and project toward a radially inward side; and the second annular projection is formed such that: when the sealing device is in an initial use state, the second annular projection is not in slidable contact with the outer peripheral surface of the rotary shaft; and when the main lip and the first annular projection wear, due to use of the sealing device, to such a degree that required sealing performance cannot be maintained, the second annular projection starts slidable contact with the outer peripheral surface of the rotary shaft.

According to the sealing device configured as described above, when the sealing device is in the initial use state, required sealing performance is ensured by the main lip and the first annular projection 20. After that, even when the sealing device is used and the main lip and the first annular projection wear, due to slidable contact thereof with the outer peripheral surface of the rotary shaft, to such a degree that required sealing performance cannot be maintained, the second annular projection starts slidable contact with the outer peripheral surface of the rotary shaft. Thus, the second annular projection can be caused to newly contribute to ensuring sealing performance, and required sealing performance can be maintained.

As described above, according to the sealing device of one or more embodiments the present invention, even when, due to wear caused by use, it becomes difficult to maintain required sealing performance by the main lip and the first annular projection, required sealing performance as the sealing device can be maintained by newly bringing the second annular projection that has not been in slidable contact, into slidable contact with the outer peripheral surface of the rotary shaft. As a result, it is possible to maintain the sealing performance over a long period of time.

In the sealing device, a plurality of the second annular projections is formed. In this case, the plurality of the second annular projections is formed such that, when the main lip and the first annular projection wear to such a degree that required sealing performance cannot be maintained, slidable contact is started in order from the second annular projection closer to the main lip, among the plurality of the second annular projections, in accordance with an amount of the wear.

In this case, since the plurality of the second annular projections start slidable contact in order in accordance with the amounts of wear of the main lip and the first annular projection, wear of the main lip and the first annular projection proceeds. After that, even when one second annular projection that has started slidable contact starts wearing, another second annular projection sequentially and newly starts slidable contact. Accordingly, it is possible to maintain the sealing performance over a further long period of time.

In the sealing device, a third annular projection may be further formed on the inclined surface and between the main lip and the second annular projection so as to be in slidable contact with the outer peripheral surface of the rotary shaft when the sealing device is in the initial use state.

In this case, when the sealing device is in the initial use state, a space between the low-pressure space and the high-pressure space can be partitioned in multiple stages by the main lip, the first annular projection, and the third annular projection. Accordingly, even when leak of the pressure from the high-pressure space side occurs, it is possible to reduce the leak in a phased manner. Thus, it is possible to maintain the sealing performance ensured in the initial use state before the second annular projection starts slidable contact, over a long period of time.

According to the sealing device of one or more embodiments of the present invention, it is possible to maintain the sealing performance over a long period of time.

DESCRIPTION OF EMBODIMENTS

Next, one or more embodiments of the present invention will be described with reference to the accompanying drawings.

Figure 1:
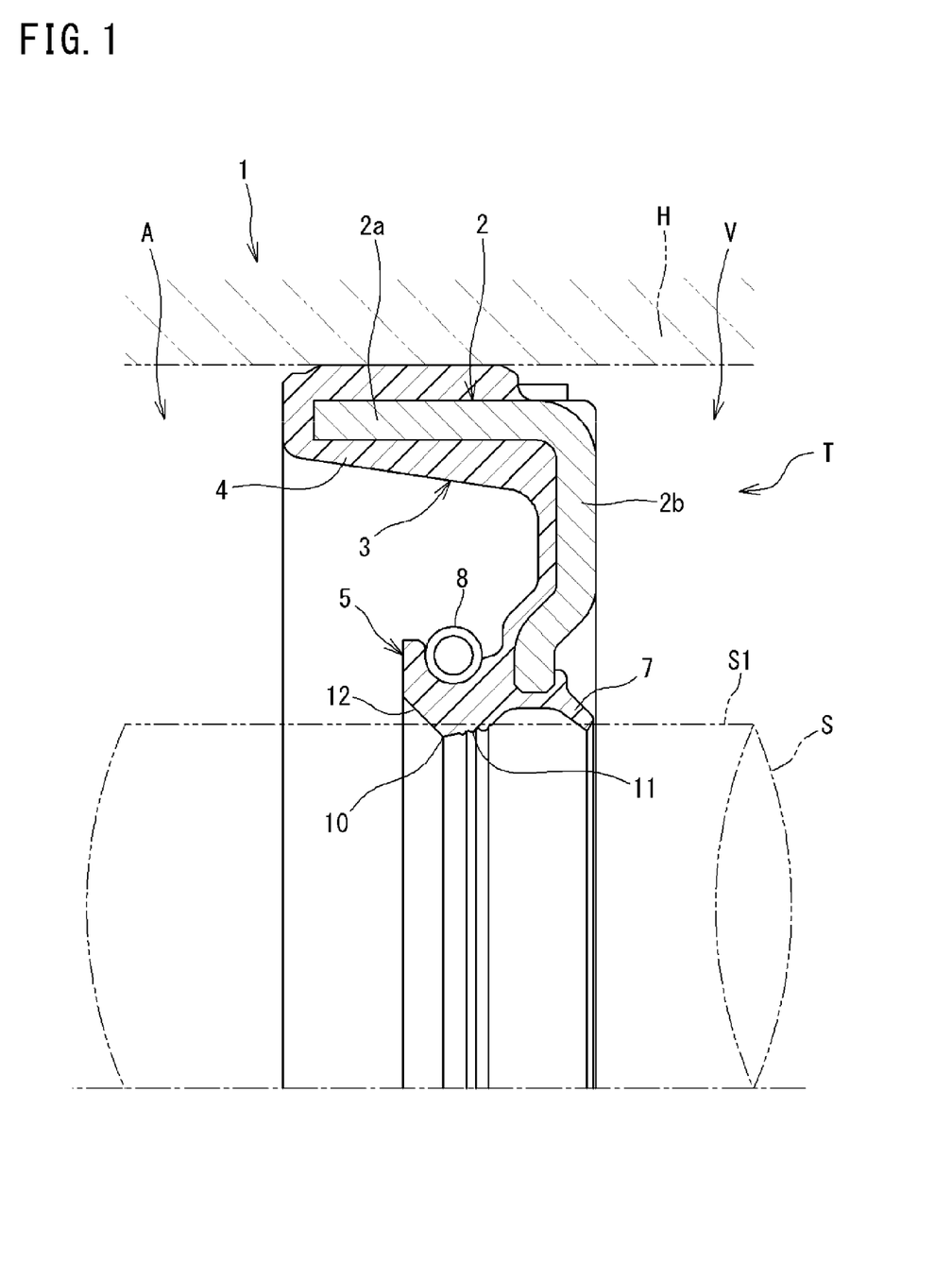
FIG. 1 is a cross-sectional view of a sealing device according to one or more embodiments of the present invention.

FIG. 1 is a cross-sectional view of a sealing device according to one or more embodiments of the present invention. The sealing device 1 is mounted to a vacuum container (not shown) whose interior is made into a vacuum environment. The sealing device 1 is used for partitioning an annular space T formed between a rotary shaft S and a housing H surrounding the rotary shaft S, into an atmospheric pressure space A (a high-pressure space, the left side of the sheet surface in FIG. 1) and a vacuum space V (a low-pressure space, the right side of the sheet surface in FIG. 1) in an axial direction, in a sealed state.

In the present embodiment, the vacuum space V is maintained in a high vacuum of $10^{-3}$ Pa (absolute pressure) or lower.

The rotary shaft S is a rotation transmission shaft for providing a rotational force to a device provided within the vacuum container. The rotary shaft S is inserted through the tubular housing H which is provided to the vacuum container and provides communication between the inside and the outside of the vacuum container, so that the rotary shaft S is provided so as to project from the vacuum space V which is the inside of the vacuum container toward the atmospheric pressure space A which is the outside of the vacuum container.

The sealing device 1 partitions the annular space T in an axial direction such that the rotary shaft S is rotatable. The sealing device 1 includes a core metal 2 made of a metal, and a seal member 3 which is formed of an elastic material such as fluorocarbon rubber and bonded by vulcanization to the core metal 2.

The core metal 2 is formed in an annular shape by pressing a steel plate such as SPCC. The core metal 2 includes a cylindrical portion 2a having a cylindrical shape, and an annular portion 2b formed by bending an end portion, at one side in the axial direction, of the cylindrical portion 2a to a radially inner side. The core metal 2 is formed so as to have an L cross-sectional shape.

The seal member 3 includes: a body portion 4 which is formed and bonded so as to extend from the outer peripheral surface of the cylindrical portion 2a around an end surface, at the atmospheric pressure space A side, of the cylindrical portion 2a, extend along the inner peripheral surface of the cylindrical portion 2a, and extend along a side surface, at the atmospheric pressure space A side, of the annular portion 2b; a seal portion 5 extending from the inner peripheral end of the annular portion 2b; and an auxiliary lip 7 similarly extending from the inner peripheral end of the annular portion 2b.

The core metal 2 is press-fitted into the housing H via the body portion 4. Accordingly, the sealing device 1 is fixed to the housing H.

The auxiliary lip 7 is provided so as to extend from the inner peripheral end of the annular portion 2b as a base end toward the vacuum space V side and project toward the radially inner side to be in slidable contact with an outer peripheral surface S1 of the rotary shaft S.

The seal portion 5 is an annular member extending from the inner peripheral end of the annular portion 2b as a base end toward the atmospheric pressure space A side.

A garter spring 8 for enhancing the sealing performance by tightening and pressing the seal portion 5 toward the radially inner side is mounted at the outer peripheral surface side of the seal portion 5.

The seal portion 5 is in slidable contact with the outer peripheral surface S1 of the rotary shaft S, sealing between the vacuum space T and the atmospheric pressure space A so as to prevent the pressure of the atmospheric pressure space A from leaking through between the rotary shaft S and the housing H to the vacuum space V.

On the inner peripheral surface of the seal portion 5, a main lip 10 is formed so as to be in slidable contact with the outer peripheral surface S1 of the rotary shaft S, a vacuum space side inclined surface 11 is formed so as to extend from the main lip 10 toward the vacuum space V side and gradually enlarge in diameter toward the vacuum space V side, and an atmospheric space side inclined surface 12 is formed so as to extend from the main lip 10 toward the atmospheric pressure space A side and gradually enlarge in diameter toward the atmospheric pressure space A side. Thus, the main lip 10 is composed of a ridge at which the vacuum space side inclined surface 11 and the atmospheric space side inclined surface 12 intersect each other, and is formed so as to have a mountain-like cross-sectional shape.

The seal portion 5 extends from the inner peripheral end of the annular portion 2b as a base end toward the atmospheric pressure space A side as described above. Therefore, the seal portion 5 is configured such that the end portion thereof at the atmospheric pressure space A side can oscillate about the end portion thereof at the vacuum space V side in the radial direction. FIG. 1 shows the seal portion 5 that is in a free state.

When the rotary shaft S is inserted into the inner peripheral side of the seal portion 5, the end portion, at the atmospheric pressure space A side, of the seal portion 5 oscillates toward a radially outer side, and the end portion, at the atmospheric pressure space A side, and the main lip 10, of the seal portion 5 elastically deform so as to slightly enlarge in diameter. The main lip 10 is in slidable contact with the outer peripheral surface S1 of the rotary shaft S in a state where the main lip 10 elastically deforms so as to slightly enlarge in diameter.

Figure 2:
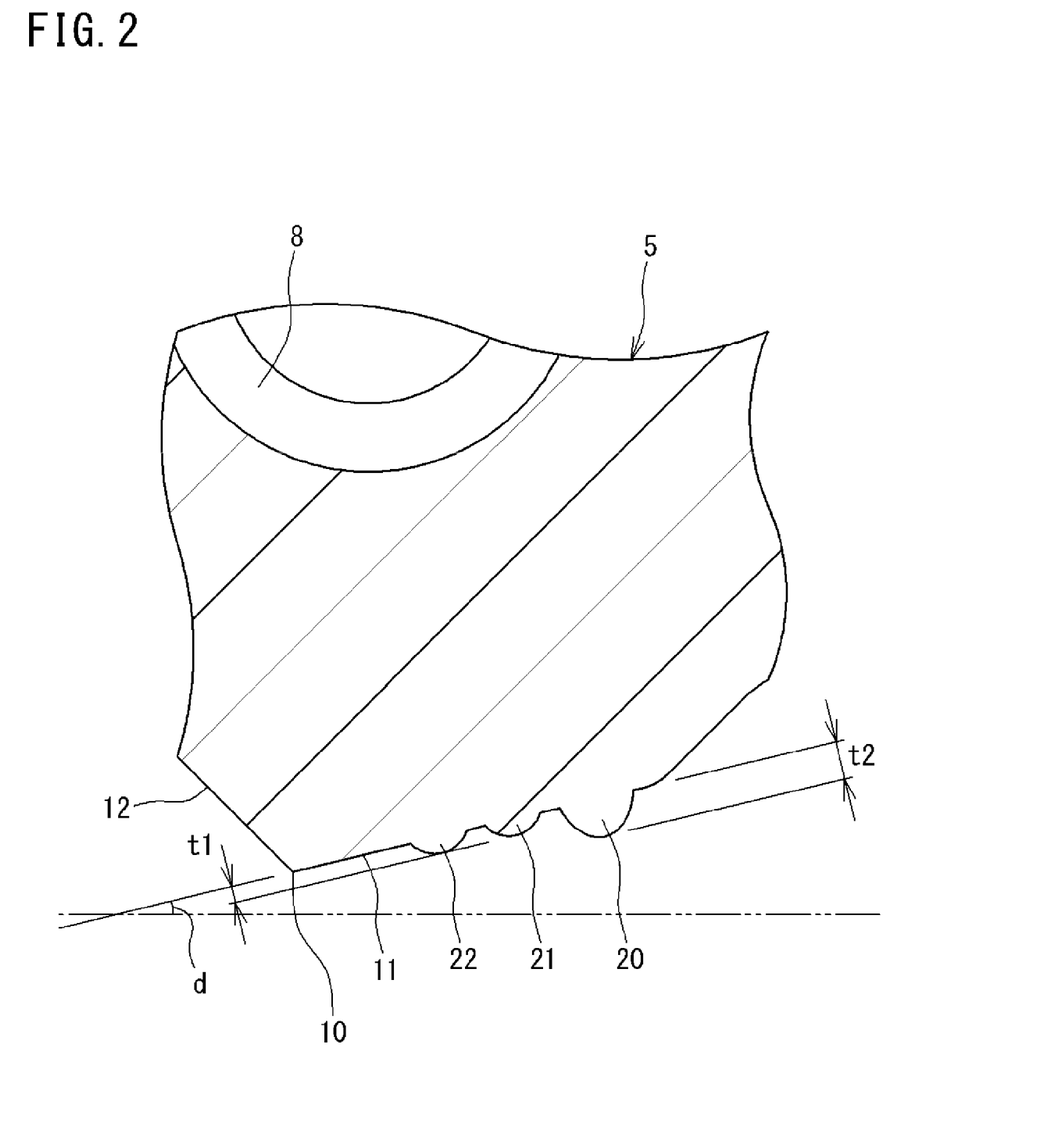
FIG. 2 is an enlarged cross-sectional view of a main part of a seal portion in FIG. 1.

FIG. 2 is an enlarged cross-sectional view of a main part of the seal portion 5 in FIG. 1. FIG. 2 shows the seal portion 5 that is in a free state.

The vacuum space side inclined surface 11 of the seal portion 5 is formed as a conical inner peripheral surface whose inclination angle d relative to the axial direction is set, for example, in a range of 10 to 20 degrees.

On the vacuum space side inclined surface 11, a first annular projection 20 is formed so as to project from the vacuum space side inclined surface 11 toward the radially inner side.

In addition, a second annular projection 21 is formed between the main lip 10 and the first annular projection 20 so as to project from the vacuum space side inclined surface 11 toward the radially inner side similarly to the first annular projection 20.

Furthermore, a third annular projection 22 is formed between the main lip 10 and the second annular projection 21 so as to project from the vacuum space side inclined surface 11 toward the radially inner side.

Each of the annular projections 20 to 22 is formed such that a distal end thereof has a circular arc cross-sectional shape.

The second annular projection 21 and the third annular projection 22 are formed such that projection dimensions thereof based on the vacuum space side inclined surface 11 are projection dimensions t1 that are equal to each other.

The first annular projection 20 is formed such that a projection dimension t2 thereof is a value larger than the projection dimension t1 of each of the second annular projection 21 and the third annular projection 22 (e.g., approximately 2 to 3 times of t1).

The projection dimension t2 of the first annular projection 20 is set to such a value that, as described later, when the sealing device 1 is inserted into the rotary shaft S such that the main lip 10 (and the third annular projection 22) is in slidable contact with the outer peripheral surface S1, the distal end of the first annular projection 20 is in slidable contact with the outer peripheral surface S1.

Meanwhile, the projection dimension t1 of the second annular projection 21 is set to such a value that: when the sealing device 1 is in an initial use state, the second annular projection 21 is not in slidable contact with the outer peripheral surface S1 of the rotary shaft S; and when the main lip 10 and the first annular projection 20 wear due to use, the second annular projection 21 starts slidable contact with the outer peripheral surface S1 of the rotary shaft S.

The initial use state of the sealing device 1 refers to a state immediately after the sealing device 1 that has not been used is fixed to the housing H and use of the sealing device 1 is started, the state being a state where wear of the main lip 10 and the first annular projection 20 is not observed.

Figure 3:
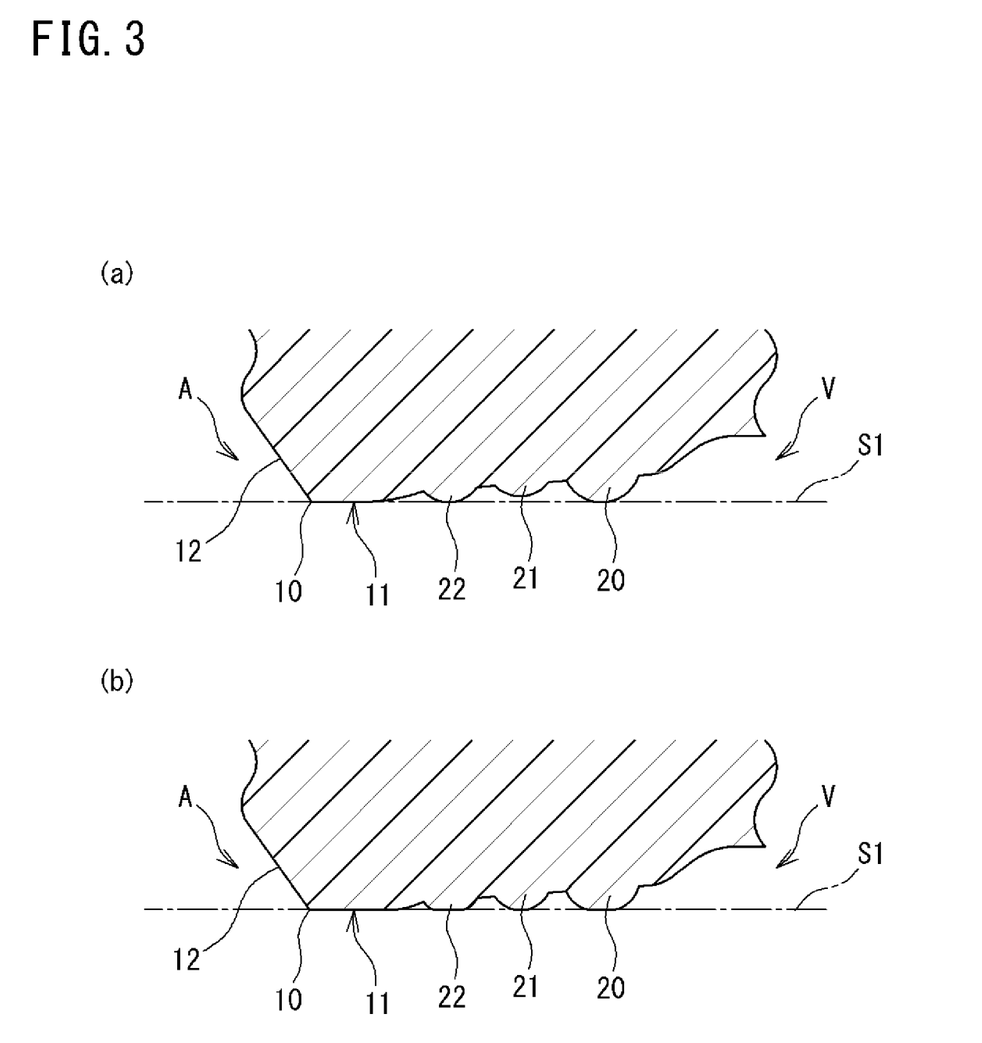
FIG. 3 is cross-sectional views of a main lip when a rotary shaft is inserted into the inner peripheral side of the sealing device, (a) shows an initial use state of the sealing device, and (b) shows a state where the main lip, a first annular projection, and a third annular projection have worn as a result of use of the sealing device.

FIG. 3 is cross-sectional views of the main lip 10 when the rotary shaft S is inserted into the inner peripheral side of the sealing device 1. FIG. 3(a) shows the initial use state of the sealing device 1.

As described above, when the rotary shaft S is inserted into the inner peripheral surface side of the seal portion 5, the end portion, at the atmospheric pressure space A side, of the seal portion 5 oscillates about the end portion, at the vacuum space V side, of the seal portion 5 toward the radially outer side. In addition, the main lip 10 is in slidable contact with the outer peripheral surface S1 of the rotary shaft S in a state where the main lip 10 elastically deforms so as to slightly enlarge in diameter.

Moreover, the inclination angle d (FIG. 2) of the vacuum space side inclined surface 11 decreases as a result of the oscillation of the end portion, at the atmospheric pressure space A side, of the seal portion 5 toward the radially outer side. Thus, the vacuum space side inclined surface 11 comes close to the outer peripheral surface S1 of the rotary shaft S. Accordingly, the distal end of the first annular projection 20 comes into slidable contact with the outer peripheral surface S1 of the rotary shaft S. That is, the first annular projection 20 is formed such that the distal end thereof is in slidable contact with the outer peripheral surface S1 in a state where the main lip 10 is in slidable contact with the outer peripheral surface S1 of the rotary shaft S.

Furthermore, similarly to the first annular projection 20, the third annular projection 22 is also formed such that the distal end thereof is in slidable contact with the outer peripheral surface S1 in a state where the main lip 10 is in slidable contact with the outer peripheral surface S1 of the rotary shaft S.

Each of the main lip 10, the first annular projection 20, and the third annular projection 22 is formed such that an inner diameter dimension thereof when the seal portion 5 is in a free state is a predetermined dimension smaller than the outer diameter dimension of the rotary shaft S.

When the rotary shaft S is inserted so that the seal portion 5 elastically deforms as described, the main lip 10, the first annular projection 20, and the third annular projection 22, which are formed with the above dimensions, enlarge in diameter and come into slidable contact with the outer peripheral surface S1 of the rotary shaft S. Accordingly, a predetermined interference with respect to the outer peripheral surface S1 of the rotary shaft S is set in each of the main lip 10, the first annular projection 20, and the third annular projection 22.

In addition, the second annular projection 21 is formed such that the inner diameter dimension thereof when the main lip 10, the first annular projection 20, and the third annular projection 22 are brought into slidable contact with the outer peripheral surface S1 of the rotary shaft S is larger than the diameter of the outer peripheral surface S1 of the rotary shaft S.

Therefore, in FIG. 3(a), the second annular projection 21 is not in contact with the outer peripheral surface S1 of the rotary shaft S. As described above, the second annular projection 21 is formed such that the second annular projection 21 is not in slidable contact with the outer peripheral surface S1 of the rotary shaft S when the sealing device 1 is in the initial use state and in a state where the main lip 10, the first annular projection 20, and the third annular projection 22 have not worn much.

Accordingly, when the sealing device 1 is in the initial use state, the sealing device 1 seals between the atmospheric pressure space A and the vacuum space V by the main lip 10, the first annular projection 20, and the third annular projection 22.

In the state of FIG. 3(a), when the sealing device 1 continues to be used, wear of the main lip 10, the first annular projection 20, and the third annular projection 22 gradually proceeds due to the slidable contact thereof with the outer peripheral surface S1 of the rotary shaft S.

If the wear of the main lip 10, the first annular projection 20, and the third annular projection 22 proceeds, contact surfaces thereof increase due to the wear, and the interference that is set in each of the main lip 10, the first annular projection 20, and the third annular projection 22 beforehand also decreases due to the wear, so that the surface pressures of the main lip 10, the first annular projection 20, and the third annular projection 22 with respect to the outer peripheral surface S1 decrease. As a result, the sealing performance of the sealing device 1 gradually diminishes with the progress of the wear.

FIG. 3(b) is a cross-sectional view of the main lip 10 when the rotary shaft S is inserted into the inner peripheral side of the sealing device 1, and shows a state where the main lip 10, the first annular projection 20, and the third annular projection 22 have worn as a result of the sealing device 1 being used over a long period of time.

As shown in FIG. 3(b), the projection dimensions of the first annular projection 20 and the third annular projection 22 which project from the vacuum space side inclined surface 11 have decreased relative to the second annular projection 21 due to the wear. Accordingly, the second annular projection 21 is in slidable contact with the outer peripheral surface S1 of the rotary shaft S.

The projection dimension of the second annular projection 21 from the vacuum space side inclined surface 11 is set to such a value that, when the main lip 10, the first annular projection 20, and the third annular projection 22 wear to such a degree that required sealing performance as the sealing device 1 cannot be maintained, the second annular projection 21 comes into slidable contact with the outer peripheral surface S1 of the rotary shaft S.

Accordingly, the second annular projection 21 is formed such that: when the sealing device 1 is in the initial use state, the second annular projection 21 is not in slidable contact with the outer peripheral surface S1 of the rotary shaft S; and, after that, when the main lip 10, the first annular projection 20, and the third annular projection 22 wear to such a degree that required sealing performance cannot be maintained, the second annular projection 21 starts slidable contact with the outer peripheral surface S1 of the rotary shaft S.

Therefore, even when the main lip 10, the first annular projection 20, and the third annular projection 22 wear to such a degree that required sealing performance cannot be maintained, the second annular projection 21 starts slidable contact. Thus, as shown in FIG. 3(b), a space between the vacuum space V and the atmospheric pressure space A can be partitioned in multiple stages (four stages) by four portions, that is, the main lip 10, the first annular projection 20, the third annular projection 22, and the second annular projection 21. Accordingly, even when leak of the pressure from the atmospheric pressure space A side through the main lip 10 occurs, it is possible to reduce the leak in a phased manner by the respective annular projections 20 to 22, which are formed at the vacuum space V side. As a result, it is possible to suppress leak of the pressure from the atmospheric pressure space A toward the vacuum space V.

In the present embodiment, the projection dimension of the second annular projection 21 from the vacuum space side inclined surface 11 is set to the projection dimension t1, which is equal to that of the third annular projection 22, as described above. In addition, the dimension of each portion including the setting of the projection dimension t2 of the first annular projection 20 is set such that: when the sealing device 1 is in the initial use state, the second annular projection 21 is not in slidable contact with the outer peripheral surface S1 of the rotary shaft S; and, after that, when each portion wears to such a degree that required sealing performance cannot be maintained, the second annular projection 21 starts slidable contact with the outer peripheral surface S1 of the rotary shaft S.

According to the sealing device 1 configured as described above, when the sealing device 1 is in the initial use state, required sealing performance is ensured by the main lip 10, the first annular projection 20, and the third annular projection 22. After that, even when the sealing device 1 is used and the main lip 10, the first annular projection 20, and the third annular projection 22 wear, due to slidable contact thereof with the outer peripheral surface S1 of the rotary shaft S, to such a degree that required sealing performance cannot be maintained, the second annular projection 21 starts slidable contact with the outer peripheral surface S1 of the rotary shaft S. Thus, the second annular projection can be caused to newly contribute to ensuring sealing performance, and required sealing performance can be maintained.

As described above, according to the sealing device 1 of one or more embodiments of the present invention, even when, due to wear caused by use, it becomes difficult to maintain required sealing performance by the main lip 10, the first annular projection 20, and the third annular projection 22, required sealing performance as the sealing device 1 can be maintained by newly bringing the second annular projection 21 that has not being in slidable contact, into slidable contact with the outer peripheral surface S1 of the rotary shaft S. As a result, it is possible to maintain the sealing performance over a long period of time.

In the present embodiment, since the third annular projection 22 is formed on the vacuum space side inclined surface 11 and between the main lip 10 and the second annular projection 21 so as to be in slidable contact with the outer peripheral surface S1 of the rotary shaft S when the sealing device 1 is in the initial use state, when the sealing device 1 is in the initial use state, the space between the vacuum space V and the atmospheric pressure space A can be partitioned in multiple stages (three stages) by the main lip 10, the first annular projection 20, and the third annular projection 22. Accordingly, even when leak of the pressure from the atmospheric pressure space A side occurs, it is possible to reduce the leak in a phased manner. As a result, it is possible to maintain the sealing performance ensured in the initial use state before the second annular projection 21 starts slidable contact, over a long period of time.

According to the present embodiment, the respective annular projections 20 to 22 form a plurality of annular spaces between the respective annular projections 20 to 22 and the adjacent annular projections or the main lip 10. It is possible to cause a lubricant supplied between the main lip 10 and the rotary shaft S, to remain in these annular spaces. That is, when the sealing device 1 is in the initial use state, a plurality of annular spaces can be formed by the main lip 10, the first annular projection 20, and the third annular projection 22 and caused to function as an oil reservoir. In addition, when wear of the main lip 10, the first annular projection 20, and the third annular projection 22 proceeds so that the second annular projection 21 newly comes into slidable contact with the outer peripheral surface S1, the number of the annular spaces increases, so that the function as an oil reservoir can be enhanced.

Accordingly, it is possible to reduce the frictional force between the main lip 10 and the outer peripheral surface S1 of the rotary shaft S, so that it is possible to suppress stick slip and it is possible to reduce wear occurring with friction. Thus, it is possible to maintain the sealing performance over a further long period of time.

Figure 4:
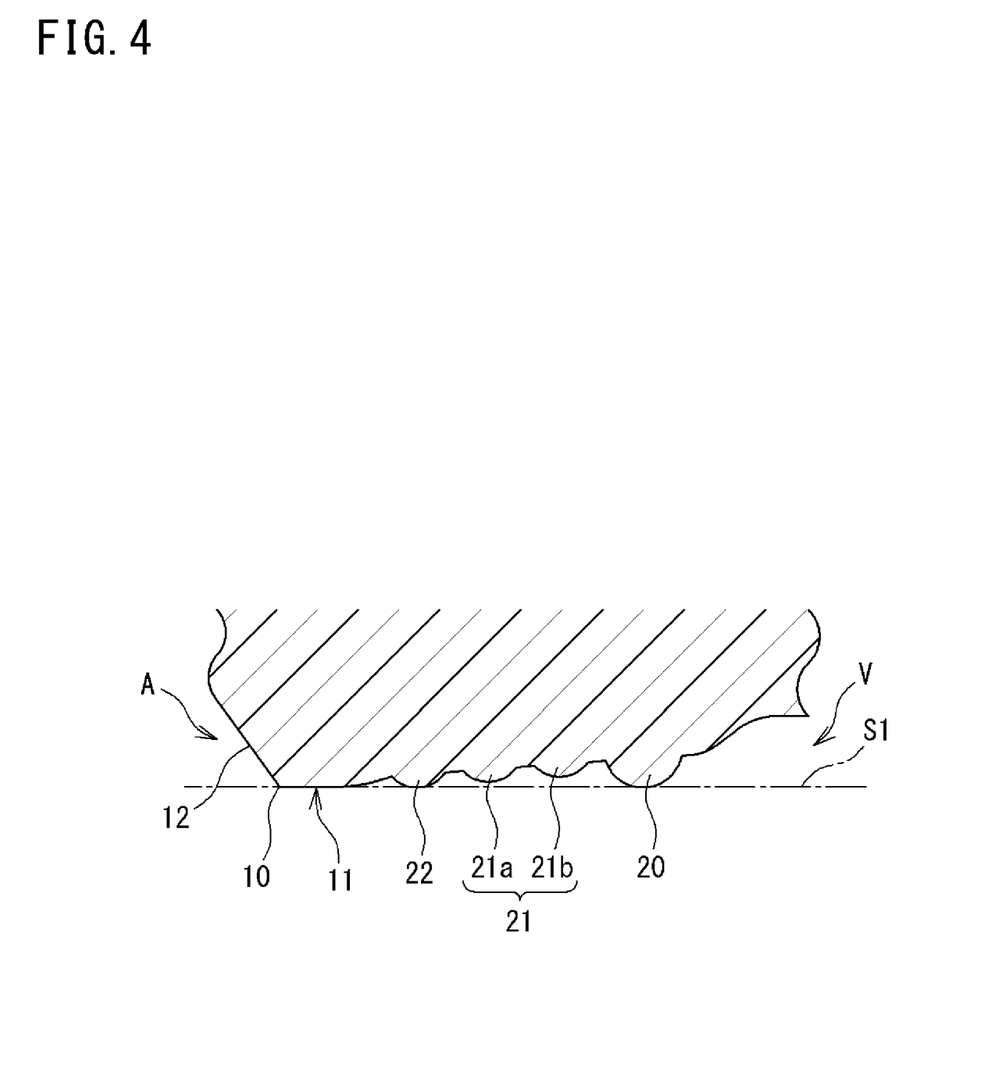
FIG. 4 is a cross-sectional view of a main lip according to one or more embodiments of the present invention and shows an initial use state of a sealing device 1.

FIG. 4 is a cross-sectional view of a main lip 10 according to one or more embodiments of the present invention, and shows the initial use state of the sealing device 1.

The main lip 10 of the present embodiment is different from that of the above embodiment in that a plurality of second annular projections 21 (two in the shown example) are formed.

Since the initial use state of the sealing device 1 is shown in the drawing, the plurality of second annular projections 21a, 21b are not in contact with the outer peripheral surface S1 of the rotary shaft S.

The second annular projection 21a at the main lip 10 side is formed such that the inner diameter dimension thereof when the main lip 10 and the first annular projection 20 are brought into slidable contact with the rotary shaft S is smaller than that of the second annular projection 21b at the first annular projection 20 side.

Thus, when the sealing device 1 is used and wear of the main lip 10, the first annular projection 20, and the third annular projection 22 proceeds due to slidable contact thereof with the outer peripheral surface S1 of the rotary shaft S, the second annular projection 21a at the main lip 10 side initially starts slidable contact with the outer peripheral surface S1 of the rotary shaft S.

After that, when the wear of each portion further proceeds due to the use so that the amount of the wear further increases, the second annular projection 21b at the first annular projection 20 side starts slidable contact with the outer peripheral surface S1 of the rotary shaft S.

As described above, in the present embodiment, the plurality of second annular projections 21a and 21b are formed such that slidable contact is started in order from the second annular projection 21a at the main lip 10 side closer to the main lip 10, among the plurality of second annular projections 21a and 21b, in accordance with the amounts of wear of the main lip 10, the first annular projection 20, and the third annular projection 22.

The projection dimension of each of the second annular projections 21a and 21b from the vacuum space side inclined surface 11 in the present embodiment is set to the projection dimension t1 (FIG. 2), which is the equal to that of the third annular projection 22.

The second annular projections 21a and 21b are formed along the vacuum space side inclined surface 11 which gradually enlarges in diameter toward the vacuum space V side. By forming the second annular projections 21a and 21b with the projection dimensions t1 that are equal to each other, the second annular projection 21a at the main lip 10 is formed such that the inner diameter dimension thereof when the main lip 10 and the first annular projection 20 are brought into slidable contact with the rotary shaft S is smaller than that of the second annular projection 21b at the first annular projection 20 side.

According to the present embodiment, since the plurality of second annular projections 21a and 21b start slidable contact in order in accordance with the amounts of wear of the main lip 10, the first annular projection 20, and the third annular projection 22, even when wear of the main lip 10, the first annular projection 20, and the third annular projection 22 proceeds and the second annular projection 21a that has started slidable contact wears later, the second annular projection 21b sequentially and newly starts slidable contact. Accordingly, it is possible to maintain the sealing performance over a further long period of time.

In the present embodiment, the case where the two second annular projections 21 are provided has been shown. However, more second annular projections 21 may be provided.

In the present embodiment, the case has been shown where the plurality of second annular projections 21a and 21b are formed such that, in order that slidable contact is started in order from the second annular projection 21a at the main lip 10 side closer to the main lip 10, among the plurality of second annular projections 21a and 21b, in accordance with the amounts of wear of the main lip 10, the first annular projection 20, and the third annular projection 22, the inner diameter dimension of the second annular projection 21a when the main lip 10 and the first annular projection 20 are brought into slidable contact with the rotary shaft S is smaller than the second annular projection 21b at the first annular projection 20 side. However, for example, the plurality of second annular projections 21a and 21b may be formed such that the inner diameter dimensions thereof when the main lip 10 and the first annular projection 20 are brought into slidable contact with the rotary shaft S are equal to each other.

Accordingly, when the main lip 10, the first annular projection 20, and the third annular projection 22 wear to such a degree that required sealing performance cannot be maintained, slidable contact of the plurality of second annular projections 21a and 21b with the outer peripheral surface S1 of the rotary shaft S can be started at substantially the same timing.

In this case as well, even when the main lip 10, the first annular projection 20, and the third annular projection 22 wear, required sealing performance can be maintained by newly bringing the plurality of second annular projections 21a and 21b that have not being in slidable contact, into slidable contact with the outer peripheral surface S1 of the rotary shaft S, so that it is possible to maintain the sealing performance over a long period of time.

Figure 5:
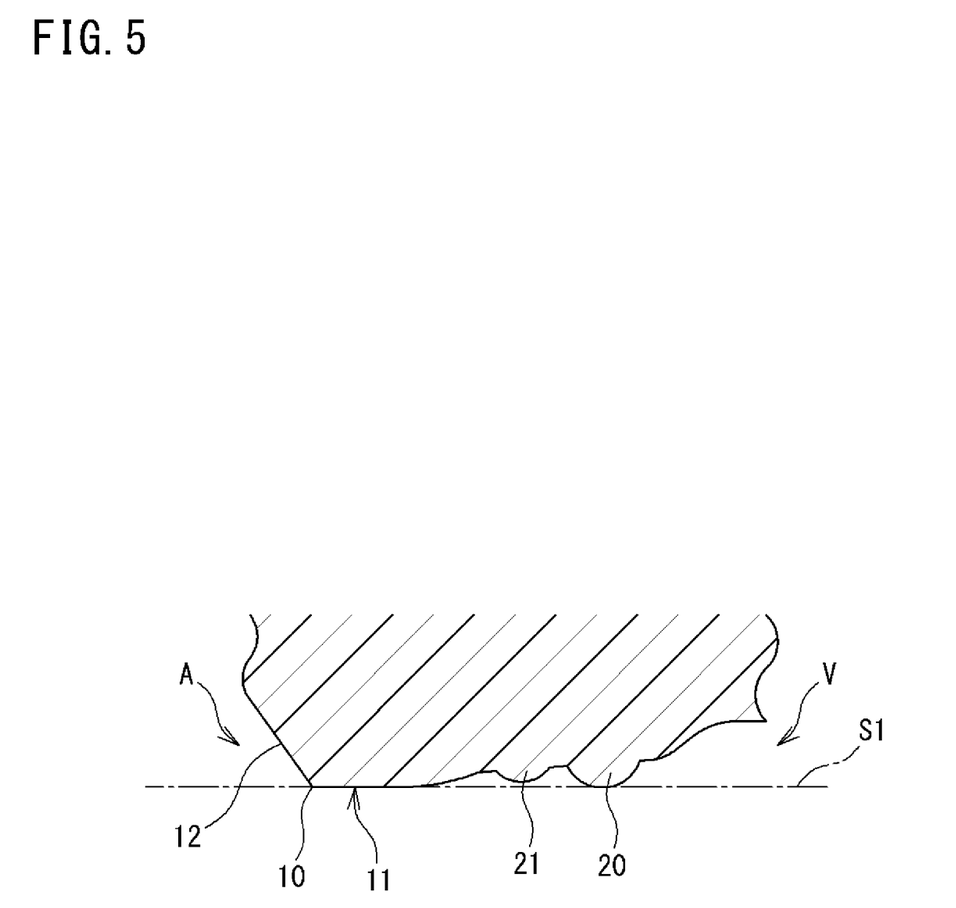
FIG. 5 is a cross-sectional view of a main lip according to one or more embodiments of the present invention.

The present invention is not limited to the above embodiments. In the above embodiments, the case has been shown where the third annular projection 22 is formed between the main lip 10 and the second annular projection 21. However, for example, only the second annular projection 21 may be formed between the main lip 10 and the first annular projection 20 as shown in FIG. 5.

In this case as well, even when it becomes difficult to maintain required sealing performance by the main lip 10 and the first annular projection 20, required sealing performance can be maintained by newly bringing the second annular projection 21 that has not been in slidable contact, into slidable contact with the outer peripheral surface S1 of the rotary shaft S, so that it is possible to maintain the sealing performance over a long period of time.

REFERENCE SIGNS LIST 1 sealing device
10 main lip
11 vacuum space side inclined surface (inclined surface)
20 first annular projection
21, 21a, 21b second annular projection
22 third annular projection
S rotary shaft
S1 outer peripheral surface
T annular space
A atmospheric pressure space (high-pressure space)
V vacuum space (low-pressure space)

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A sealing device which partitions an annular space formed between a rotary shaft and a housing surrounding the rotary shaft, into a low-pressure space and a high-pressure space whose pressure is higher than that of the low-pressure space, in an axial direction, the sealing device comprising:
   an annular seal portion formed of an elastic material and being in slidable contact with an outer peripheral surface of the rotary shaft, wherein
   on an inner peripheral surface of the seal portion, a main lip is formed so as to be in slidable contact with the outer peripheral surface of the rotary shaft, and an inclined surface is formed so as to extend from the main lip toward the low-pressure space side and gradually enlarge in diameter toward the low-pressure space side, on the inclined surface, a first annular projection is formed so as to be in slidable contact with the outer peripheral surface of the rotary shaft in a state where the main lip is in slidable contact with the outer peripheral surface of the rotary shaft, and a second annular projection is formed so as to be disposed between the main lip and the first annular projection and project toward a radially inward side, the first annular projection seals the annular space formed between the rotary shaft and the housing surrounding the rotary shaft and prevents a leak of pressure from the high-pressure space to the low-pressure space with the main lip, and the second annular projection is formed such that: when the sealing device is in an initial use state, the second annular projection is not in slidable contact with the outer peripheral surface of the rotary shaft; and when the main lip and the first annular projection wear, due to use of the sealing device, to such a degree that required sealing performance cannot be maintained, the second annular projection starts slidable contact with the outer peripheral surface of the rotary shaft.

2. The sealing device according to claim 1, wherein a plurality of the second annular projections are formed.

3. The sealing device according to claim 2, wherein the plurality of the second annular projections are formed such that, when the main lip and the first annular projection wear to such a degree that required sealing performance cannot be maintained, slidable contact is started in order from the second annular projection closer to the main lip, among the plurality of the second annular projections, in accordance with an amount of the wear.

4. The sealing device according to claim 1, wherein a third annular projection is further formed on the inclined surface and between the main lip and the second annular projection so as to be in slidable contact with the outer peripheral surface of the rotary shaft when the sealing device is in the initial use state.

5. The sealing device according to claim 2, wherein a third annular projection is further formed on the inclined surface and between the main lip and the second annular projection so as to be in slidable contact with the outer peripheral surface of the rotary shaft when the sealing device is in the initial use state.

6. The sealing device according to claim 3, wherein a third annular projection is further formed on the inclined surface and between the main lip and the second annular projection so as to be in slidable contact with the outer peripheral surface of the rotary shaft when the sealing device is in the initial use state.

* * * * *